US 8,294,900 B2

(12) United States Patent
Strandjord et al.

(10) Patent No.: US 8,294,900 B2
(45) Date of Patent: Oct. 23, 2012

(54) SYSTEMS AND METHODS FOR RESONATOR FIBER OPTIC GYROSCOPE INTENSITY MODULATION CONTROL

(75) Inventors: Lee K. Strandjord, Tonka Bay, MN (US); Glen A. Sanders, Scottsdale, AZ (US); Norman Gerard Tarleton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 403 days.

(21) Appl. No.: 12/729,660

(22) Filed: Mar. 23, 2010

(65) Prior Publication Data

US 2010/0253948 A1 Oct. 7, 2010

Related U.S. Application Data

(60) Provisional application No. 61/165,697, filed on Apr. 1, 2009.

(51) Int. Cl.
*G01C 19/72* (2006.01)
(52) U.S. Cl. ...................................................... 356/464
(58) Field of Classification Search ........... 356/456–479
See application file for complete search history.

(56) References Cited

U.S. PATENT DOCUMENTS

| | | | |
|---|---|---|---|
| 4,673,293 A * | 6/1987 | Sanders | 356/470 |
| 5,090,809 A | 2/1992 | Ferrar | |
| 5,296,912 A | 3/1994 | Strandjord et al. | |
| 5,327,214 A | 7/1994 | Asami | |
| 5,563,705 A * | 10/1996 | Sanders | 356/464 |
| 5,627,644 A * | 5/1997 | Sanders | 356/464 |
| 6,204,921 B1 | 3/2001 | Strandjord et al. | |
| 6,445,455 B1 | 9/2002 | Hall et al. | |
| 7,327,460 B2 | 2/2008 | Sanders et al. | |
| 2007/0097374 A1 | 5/2007 | Ren-Young | |
| 2008/0218764 A1 | 9/2008 | Chen | |
| 2010/0002239 A1 | 1/2010 | Strandjord et al. | |

FOREIGN PATENT DOCUMENTS

WO 9641129 12/1996

OTHER PUBLICATIONS

Barbour, Neil M., "Inertial Navigation Sensors", "RTO-EN-SET-116(2008)", 2008, Publisher: Nato Otan.
Wang, Xijing, "Digitalized Optical Ring Resonator Gyroscope Using Photonic Bandgap Fiber", "Thesis", Aug. 2008, Publisher: Department of Electronic Engineering, Graduate School of Engineering.

(Continued)

*Primary Examiner* — Tarifur Chowdhury
*Assistant Examiner* — Jonathon Cook
(74) *Attorney, Agent, or Firm* — Fogg & Powers LLC

(57) ABSTRACT

Systems and methods for improved resonator fiber optic gyroscope intensity modulation control are provided. In one embodiment, a resonant fiber optic gyroscope (RFOG) having a residual intensity modulation (RIM) controller comprises: an intensity modulator optically coupled to receive a light beam from a laser source modulated at a resonance detection modulation frequency; an optical tap device optically coupled to the intensity modulator; and a feedback servo coupled to the optical tap device and the intensity modulator, the demodulating feedback servo generating a sinusoidal feedback signal to the intensity modulator. The feedback servo adjusts an amplitude and phase of the sinusoidal feedback signal provided to intensity modulator based on a residual intensity modulation detected by the demodulating feedback servo.

19 Claims, 4 Drawing Sheets

OTHER PUBLICATIONS

Yao et al, "FOG Source Error and Eliminating Analysis: Analysis on Light Source Intensity Noise and Noise Subtraction Method for Fib", "Laser Journal 2005", 2005, vol. 26, No. 5.

Ying et al., "Analysis of Kerr Effect in Resonator Fiber Optic Gyros With Triangular Wave Phase Modulation", "2010 Optical Society of America", Jan. 20, 2010, pp. 529-535, vol. 29, No. 3.

U.S. Patent and Trademark Office, "Final Office Action", "U.S. Appl. No. 12/581,715", May 17, 2012.

U.S. Patent and Trademark Office, "Office Action", "U.S. Appl. No. 12/581,715", Dec. 20, 2011.

European Patent Office, "European Search Report", mailed Feb. 22, 2012, Published in: EP.

* cited by examiner

SYSTEMS AND METHODS FOR RESONATOR FIBER OPTIC GYROSCOPE INTENSITY MODULATION CONTROL

CROSS-REFERENCE TO RELATED APPLICATIONS

This application claims the benefit of U.S. Provisional Application Ser. No. 61/165,697, titles "LIGHT INTENSITY MODULATION CONTROL" filed Apr. 1, 2009, of which is hereby incorporated by reference.

BACKGROUND

Resonator fiber optic gyros (RFOGs) have tremendous potential for meeting the needs of many navigation and attitude control markets. One major source of rotation error that could limit the realized RFOG performance is intensity modulation that is generated when performing frequency or phase modulation of the light that is used for probing the resonator resonance frequency and determining rotation. Within the art available today, to achieve performance potentials the intensity modulation from existing frequency or phase modulators needs to be reduced by as much as 60 dB at the resonance detection modulation frequency. A servo that directly controls the intensity of the light via an intensity modulator can be used, however a very high speed intensity modulator would need to be employed. Integrated optics intensity modulators made from Lithium Niobate waveguides provide very high speed intensity modulation, but tend to have significant optical loss, are relatively large and costly. There are other types of intensity modulators that have significantly lower optical loss, are small and inexpensive, but do not provide the speed necessary to employ prior art intensity servos.

For the reasons stated above and for other reasons stated below which will become apparent to those skilled in the art upon reading and understanding the specification, there is a need in the art for improved systems and methods for resonator fiber optic gyroscope intensity modulation control.

SUMMARY

The embodiments of the present invention provide methods and systems for resonator fiber optic gyroscope intensity modulation control and will be understood by reading and studying the following specification.

In one embodiment, a resonant fiber optic gyroscope (RFOG) having a residual intensity modulation (RIM) controller comprises: an intensity modulator optically coupled to receive a light beam from a laser source modulated at a resonance detection modulation frequency; an optical tap device optically coupled to the intensity modulator; and a feedback servo coupled to the optical tap device and the intensity modulator, the demodulating feedback servo generating a sinusoidal feedback signal to the intensity modulator. The feedback servo adjusts an amplitude and phase of the sinusoidal feedback signal provided to intensity modulator based on a residual intensity modulation detected by the demodulating feedback servo.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

In a resonator fiber optic gyroscope (RFOG), phase and frequency modulation is used to detect the center resonance frequency of the RFOG resonator. Intensity modulation is an undesired byproduct produced from performing either phase or frequency modulation of the RFOG light beams. The presence of intensity modulation on the light beam, when it occurs at the Resonance detection modulation frequency, will result in the generation of rate bias errors in the gyroscope. The purpose of a Residual Intensity Modulation (or RIM) servo in the RFOG is to reduce intensity modulation down to a level where it no loner impedes gyro performance.

Rather than taking an optical signal that is tapped off of the RFOG main light beam and directly feeding back to an intensity modulator, embodiments of the present invention provide methods and systems for a RIM servo that controls out intensity modulations at the modulation frequency. Embodiments of the present invention provide a feedback signal in the form of a sine wave at the Resonance detection modulation frequency. This sine wave controls both the amplitude and the phase of the intensity modulator for the purpose of removing the residual intensity modulation from the light beam.

Figure 1:
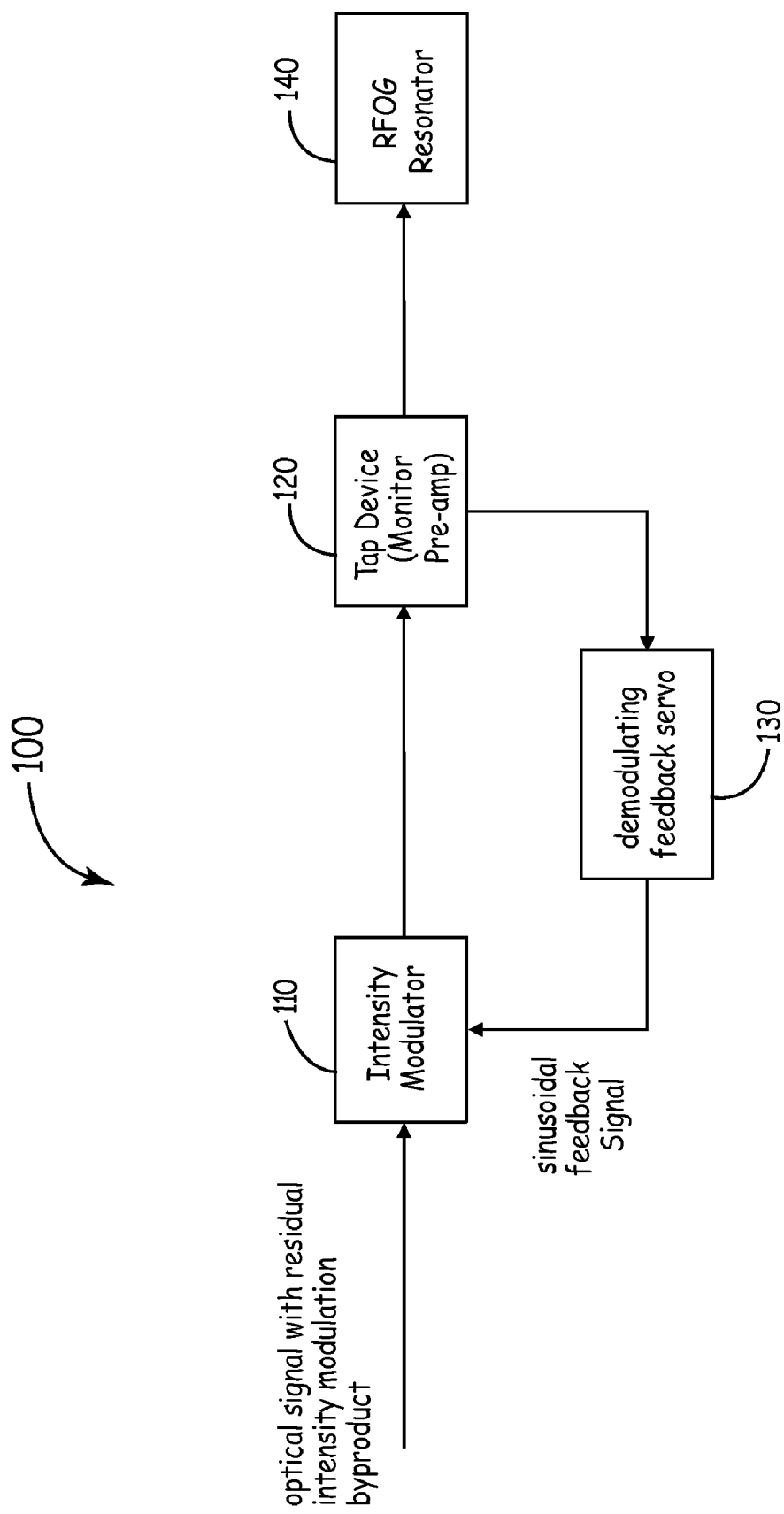
FIG. 1 is a block diagram illustrating a feedback loop circuit having a demodulating feedback servo of one embodiment of the present invention.

FIG. 1 is block diagram illustrating a feedback loop circuit 100 for a resonator fiber optic gyroscope (RFOG) of one embodiment of the present invention. Feedback loop circuit 100 comprises an intensity modulator 110, an optical tap device 120 (such as an optical monitor preamp, for example) and a demodulating feedback servo 130 of one embodiment of the present invention. The demodulating feedback servo 130 provides the RIM servo function for feedback loop circuit 100. In operation, intensity modulator 110 receives a light beam that includes undesired residual intensity modulation. If the residual intensity modulation were to remain in the light beam, it would be received by the resonator 140, resulting in the rate bias errors discussed above. Feedback loop circuit 100 drives intensity modulator 110 to remove the undesired residual intensity modulation from the light beam, using a sinusoidal signal generated at the modulation frequency specified for the RFOG. Based on the amount of residual intensity modulation that is observed at optical tap device 120, modulating feedback servo 130 adjusts the amplitude and phase of the sinusoidal feedback signal provided to intensity modulator 110 until the residual intensity modulation has been canceled out of the signal being delivered to resonator 140. The amplitude and phase adjustment provided via the sinusoidal feedback signal provides feedback information that does not require the use of a high speed intensity modulator for implementing intensity modulator 110.

Figure 2:
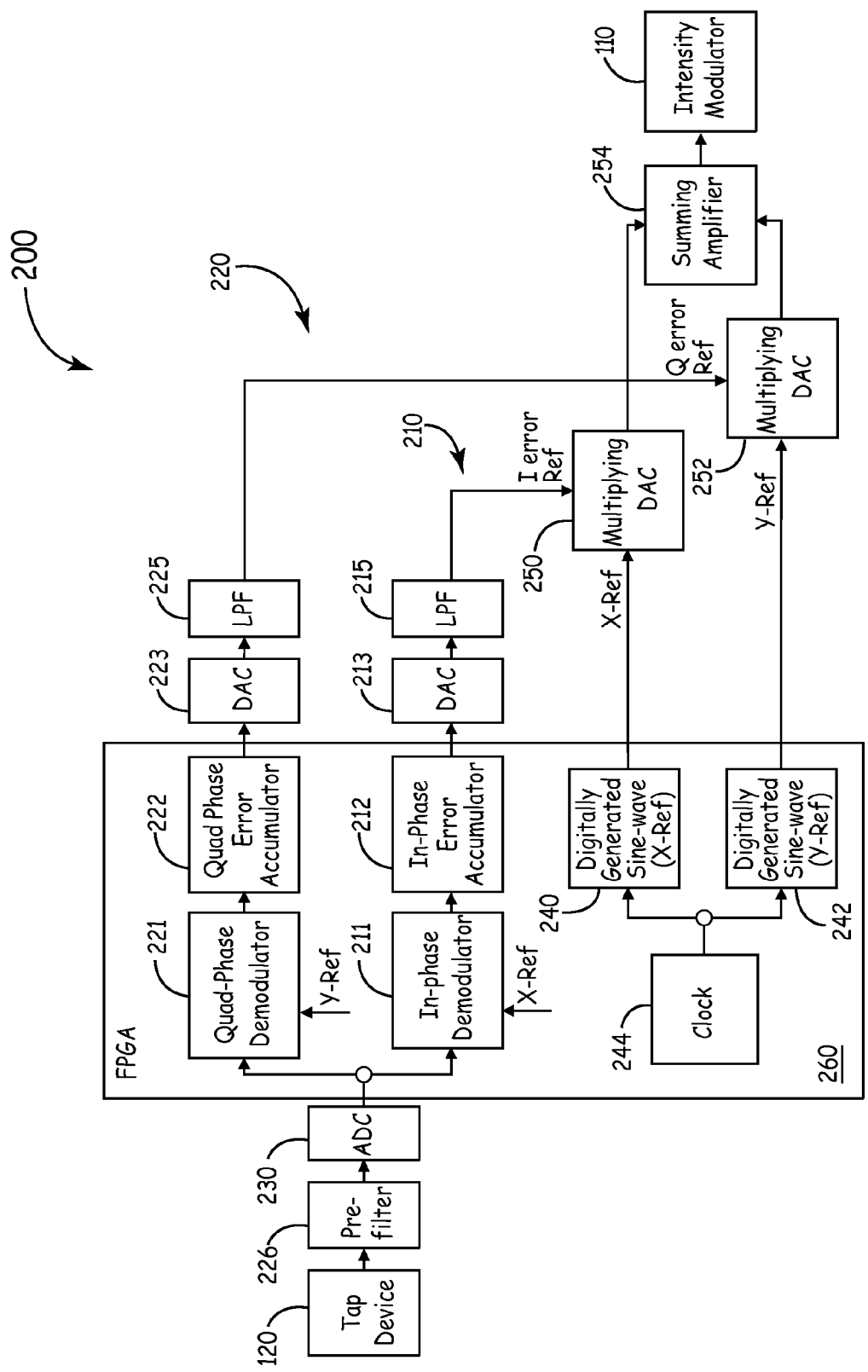
FIG. 2 is a block diagram illustrating a demodulating feedback servo of one embodiment of the present invention.

FIG. 2 is a block diagram illustrating a demodulating feedback servo 200 of one embodiment of the present invention. Demodulating feedback servo 200 comprises a first control loop 210 for processing an in-phase control signal (I) and a second control loop 220 for processing a quadrature phase control signal (Q). The first control loop 210 includes an in-phase demodulator 211, an accumulator 212, and a digital-to-analog converter (DAC) 213. The second control loop 220 includes a quadrature-phase demodulator 221, an accumulator 222, and a digital-to-analog converter (DAC) 223. Demodulating feedback servo 200 further comprises an analog to digital converter (ADC) 230 that generates digital data samples based on the light beam received by tap device 120. In one embodiment, tap device 120 includes a photo-detector that converts the received light beam into an analog electrical signal which is digitized by analog to digital converter 230. In another embodiment, the functionality ADC 230 is integrated into tap device 120 such that tap device 120 directly outputs digital data samples based on the light beam to demodulating feedback servo 200. In one embodiment, a pre-filter 226 is included to band limit the signal received by ADC 230 and provide anti-alias filtering. The digitized samples are provided to both of the two channels established by the first and second control loops 210 and 220.

Feedback control loop 210 functions as the in-phase control loop. In-phase demodulator 210 receives the digital samples of the light beam and demodulates the digital samples at the resonance detection modulation frequency (which is the frequency at which it is most desired to remove the intensity modulation). A sine-wave reference (illustrated as X-Ref) for performing this demodulation is provided by sine-wave generator 240. In one embodiment, the reference provided to In-phase demodulator 210 is a square wave version of a digitally generated sine-wave from sine-wave generator 240.

Feedback control loop 220 functions as the quadrature-phase control loop. Quad-phase demodulator 221 also receives the digital samples of the light beam and demodulates the digital samples at the Resonance detection modulation frequency using a sine-wave reference (illustrated as Y-Ref) that is 90 degrees out of phase from the X-Ref, and is provided by sine-wave generator 242. In one embodiment, the reference provided to quad-phase demodulator 220 is a square wave version of a digitally generated sine-wave from sine-wave generator 242. In one embodiment, sine-wave generators 240 and 242 are synchronized to a common clock 244.

The output of demodulators 211 and 221 are error signals that provide information needed to know the amplitude and phase of the residual intensity modulation that is to be canceled out from the light beam. That is, after demodulating out the intended modulation components from the signal, non-zero output generated by demodulators 211 and 221 is an indication of intensity modulation in respective in-phase (I) and quadrature-phase (Q) components. The balance of demodulating feedback servo 200 functions to provide feedback control that will strive to maintain those two error signals at zero.

After each of the demodulators 211 and 221 are respective accumulators 212 and 222 which integrate the respective I and Q error signals. The output of these accumulators 212 and 222 therefore keeps changing to reflect the amount of intensity modulation remaining in the light beam. It is the output of these accumulators that control the amplitude and phase of the sinusoid used to drive the intensity modulator 110. For the feedback control loop 210, digital-to-analog converter (DAC) 212 converts the in-phase accumulated digital error data into an analog error signal (shown as "I error Ref"). For the feedback control loop 220, digital-to-analog converter (DAC) 222 converts the quad-phase accumulated digital error data into an analog error signal (shown as "Q error Ref"). In one embodiment accumulators 212 and 222 may further provide for truncation to condition the digital error data for conversion into analog signals by respective DACs 213 and 223. Further, in one embodiment, low pass filters 215 and 225 are employed to remove unwanted high-frequency components from the "I error Ref" and "Q error Ref" reference signals.

Amplitude and phase corrections are derived from the "I error Ref" and "Q error Ref" reference signals as follows. The addition of two sine wave signals having the same frequency, with 90 degree phase shift between the two, will result in a sine wave of the same frequency. The phase of the resulting wave, however, will depend on the relative amplitude between the added sine waves. By adjusting the amplitudes of I and Q reference sine waves, and then summing them together, the illustrated embodiment provides feedback control in the form of a sine wave wherein the amplitude and phase are controlled.

More specifically, in one embodiment, the "I error Ref" signal output from feedback control loop 210 and the X-Ref signal from sine-wave generator 240 are multiplied together at Multiplying DAC 250. The output of Multiplying DAC 250 is a version of the X-Ref signal as multiplied by the analog "I error Ref". If "I error Ref" is zero, indicating the existence of no in-phase intensity modulation in the light beam, then zero multiplied by the X-Ref signal results in a zero amplitude sinusoidal signal output from Multiplying DAC 250. For example, if intensity modulation appears in the light beam only in quadrature, when the data samples are demodulated by demodulators 211 and 221, only an error signal from the quadrature phase demodulator 221 will be generated. No error signal will appear from in-phase demodulator 211. To the degree that in-phase intensity modulation does appear in the light beam, an error signal will accumulate in 212 resulting in a non-zero "I error Ref" signal for adjusting the amplitude of the sine-wave output from Multiplying DAC 250.

Similarly, the "Q error Ref" signal output from feedback control loop 220 and the Y-Ref signal from sine-wave generator 242 are multiplied together at Multiplying DAC 252. The output of Multiplying DAC 252 is a version of the Y-Ref signal as multiplied by the analog "Q error Ref". If "Q error Ref" is zero, indicating the existence of no quadrature-phase intensity modulation in the light beam, then zero multiplied by the Y-Ref signal results in a zero amplitude sinusoidal signal output from Multiplying DAC 252. For example, if intensity modulation appears in the light beam only in in-phase, when the data samples are demodulated by demodulators 211 and 221, only an error signal from the in-phase demodulator 211 will be generated. No error signal will appear from quadrature-phase demodulator 221. To the degree that quadrature-phase intensity modulation does appear in the light beam, the error signal will accumulate in 222 resulting in a non-zero "Q error Ref" signal for adjusting the amplitude of the sine-wave output from Multiplying DAC 252.

The sine-wave outputs from Multiplying DACs 250 and 252 are summed together at summing amplifier 254. The resulting feedback control signal from summing amplifier 254 is a sine wave having a frequency equal to the resonance detection modulation frequency, but having an amplitude and phase that is a function of the relative amplitudes between the added sine waves from Multiplying DACs 250 and 252. By controlling intensity modulator 110 with this sinusoidal feedback control signal, intensity modulator 110 will impart onto the light beam a modulation component that cancels the residual intensity modulation byproduct. Unwanted intensity modulation is completely suppressed when both demodulator 211 and 221 outputs are zero.

In one embodiment, within modulating feedback servo 200, sine-wave signal generators 240 and 242 are implemented by two direct digital synthesizer (DDS) chips that generate the X-Ref and Y-Ref sinusoidal signals at a frequency equal to the gyro modulation frequency. Similarly, in one embodiment, Multiplying DACs 250 and 252 are realized by multiplying DDS chips. Further, in one embodiment, one or more of demodulators 211, 221, accumulators 212, 222, clock 244, and sine-wave generators 240, 242 are realized via a field programmable gate array (FPGA) 260, or similar device such as, but not limited to an application-specific integrated circuit (ASIC). In one embodiment, one or all of 200 are realized via a mixed-signal ASIC.

Figure 3:
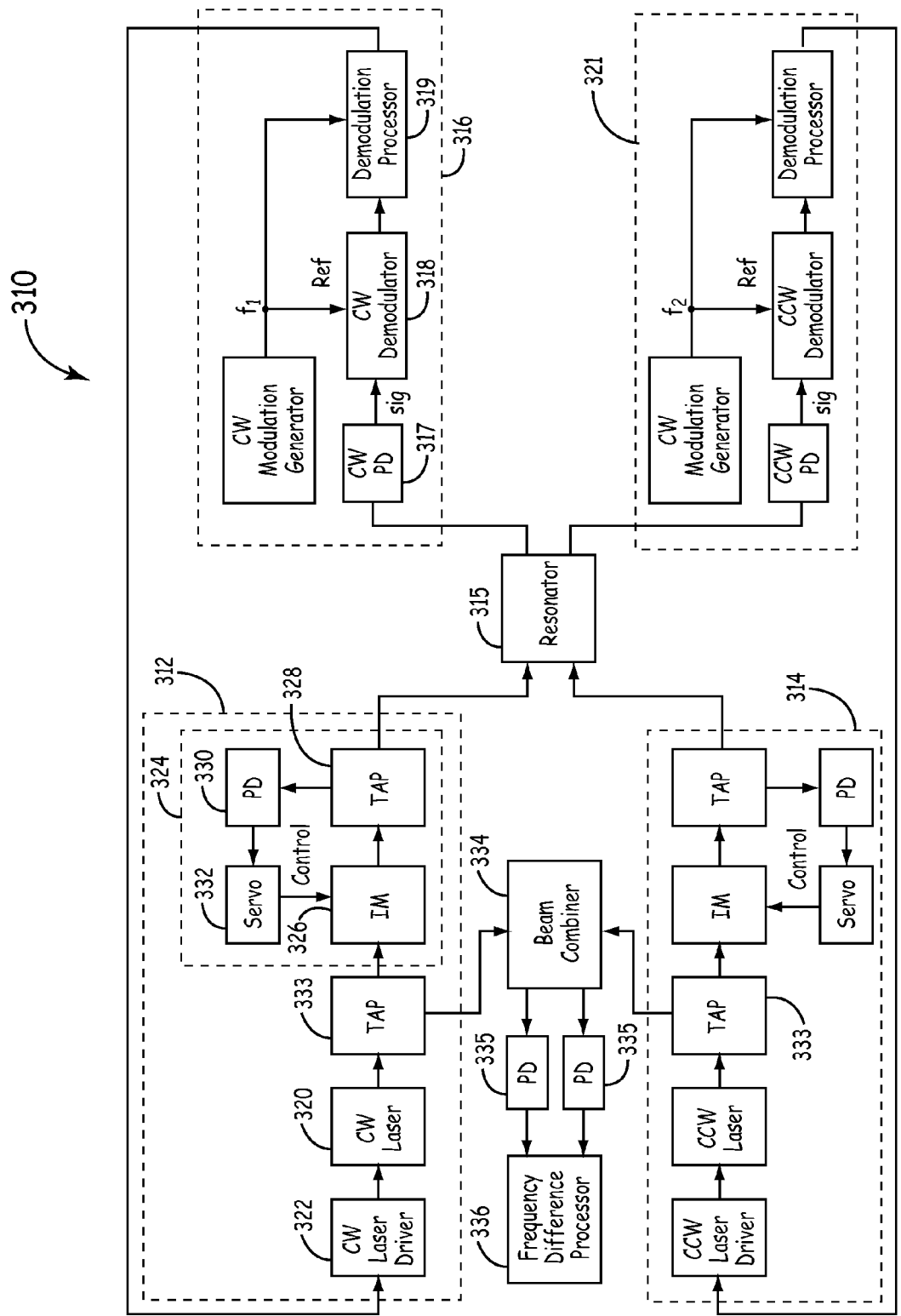
FIG. 3 is a block diagram of a resonator fiber-optic gyroscope (RFOG), including a residual intensity modulation (RIM) control loop according to one embodiment of the invention.

FIG. 3 provide a block diagram illustrating one embodiment of the present invention employing a demodulating feedback servo 332 as the residual intensity modulation (RIM) servo within an resonator fiber-optic gyroscope 310. In one embodiment, demodulating feedback servo 332 adjusts the amplitude and phase of a sinusoidal feedback signal until the residual intensity modulation has been canceled out of the signal being delivered to resonator 315, as described with respect to demodulating feedback servo 130 above. In another embodiment, demodulating feedback servo 332 utilizes dual I and Q feedback control loops as described with respect to demodulating feedback servo 200, to produce the sinusoidal feedback signal.

FIG. 3 illustrates an RFOG 310 including two laser sources—a clockwise (CW) laser source 312 and a counter-clockwise (CCW) laser source 314. The outputs of each of the two sources 312, 314 are coupled to the input of a resonator 315. The output of the resonator 315 is coupled to clockwise and counterclockwise demodulation components 316, 321 that provide a feedback signal to the clockwise and counterclockwise laser sources 312, 314.

The clockwise laser source 312 includes a laser 320, a laser driver 322 and a residual intensity modulation (RIM) control loop 324. The RIM control loop 324 includes an intensity modulator 326, a tap coupler 328, a servo loop photo-detector 330 and demodulating feedback servo 332. The clockwise demodulation component 316 includes a demodulation photo-detector 317, a demodulator 318, and a demodulation processor 319.

The components of the clockwise laser source 312 are connected in a serial branch, as follows: the laser driver 322 to the laser 320 to the intensity modulator 326 to the tap coupler 328 to the resonator 315. The components of the RIM control loop 324 are connected in a series loop, as follows: the intensity modulator 326 to the tap coupler 328 to the servo loop photo-detector 330 to the demodulating feedback servo 332 and back to the intensity modulator 326. The components of the clockwise demodulation component 316 are connected in a serial branch, as follows: the demodulation photo-detector 317 to the demodulator 318 to the demodulation processor 319. The output of the demodulation processor 319 is connected back to the laser driver 322.

The CCW laser source 314 includes a complementary set of components connected in a complementary arrangement to those included in the CW laser source 312. The CCW demodulator component 321 also includes a complementary set of components connected in a complementary arrangement to those included in the CW demodulation component 316.

In operation, the laser driver 322 drives the laser 320 to output a light beam at a given frequency. Light from the laser 320 passes through the intensity modulator 326 and the tap coupler 328 before being received by the resonator 315. The resonator 315 receives light from both the CW and CCW laser sources 312, 314, with the light beams from the two sources 312, 314 traveling around the resonator 315 in opposite directions. The demodulation components 316, 321 each receive a light beam from the resonator 315, and by detecting a signal that is indicative of the difference in the resonance frequency and the laser frequency, maintain each laser frequency at each corresponding resonance frequency.

Each demodulation component 316, 321 also outputs to the laser driver 322, which continuously drives the laser 320 to resonance frequency by continuously adjusting the frequency to keep the demodulated photo detector output signal equal to zero. This maintains each light beam at the resonance frequency.

The measure of rotation rate is the measure of the frequency difference between the CW and CCW resonance frequency. Since the laser frequencies are controlled to the resonance frequencies, the difference between the laser frequencies is a measure of rotation rate. To measure the difference between the laser frequencies, a small portion of light is tapped off from each beam just after the lasers by tap couplers 333. The tapped light from both beams is combined at a beam combiner 334. The beam combiner 334 has two outputs, each going to a photo-detector 335. The CW and CCW laser beams interfere at the two photo-detectors 335 and produce a beat signal that is an intensity variation that has a frequency equal to the frequency difference between the two laser beams. The outputs of the photo-detectors 335 go to a frequency difference processor 336 which measures the frequency of the beat signal, thus the frequency difference between the two lasers. Two detectors are necessary to determine the sign of the frequency difference.

The RIM servo loop 324 compensates for the offset between the actual resonance frequency and the frequency at which the demodulation output signal equals zero (the intensity modulation bias error). The intensity modulator 326 corrects for this difference by controlling intensity variations occurring at frequencies around the modulation frequency. The intensity modulator 326 is controlled by a negative feedback signal received at its control port from the demodulating feedback servo 332. In one embodiment, the tap coupler 328 takes a small portion of light, typically 5% to 10% of the overall beam, and re-directs the light to the servo loop photo detector 330. The servo loop photo detector 330 outputs a voltage signal proportional to the amplitude of the intensity modulation in the light signal.

In one embodiment, the demodulating feedback servo 332 digitizes the voltage signal, providing the digitized samples to independent in-phase and quadrature-phase feedback control loops. By demodulating the error samples at the resonance detection modulation frequency, in-phase and quadrature-phase error signals are derived representing the in-phase and quadrature-phase components of the residual intensity modulation present in the light beam. The in-phase and quadrature-phase error signals are used to control the amplitude of respective in-phase and quadrature-phase reference sine-waves, which are summed together to produce a sinusoidal feedback control signal to intensity modulator 326. By controlling the residual intensity modulation as it appears at the resonance detection modulation frequency, a relatively slow intensity modulator may be employed for intensity modulator 326, avoiding the need for an expensive high speed intensity modulator.

Figure 4:
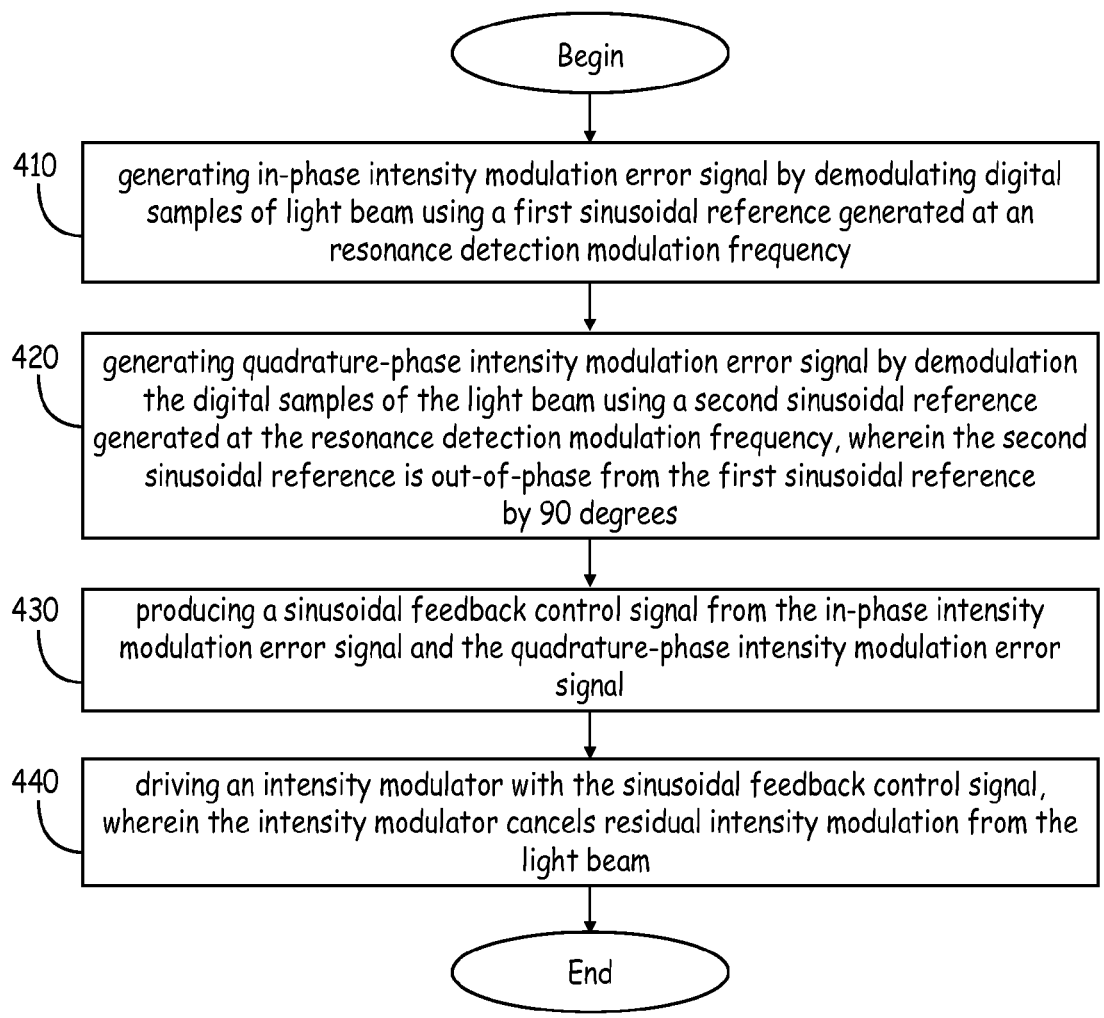
FIG. 4 is a flow chart illustrating a method of one embodiment of the present invention.

FIG. 4 is a flow chart illustrating a method of one embodiment of the present invention for canceling residual intensity modulation in an RFOG light beam. The method begins at 410 with generating in-phase intensity modulation error signal by demodulating digital samples of a light beam using a first sinusoidal reference generated at the resonance detection modulation frequency. In one embodiment, the in-phase intensity modulation error signal is generated by a first loop of a demodulating feedback servo such as described with respect to FIGS. 1 and 2.

The method proceeds to 420 with generating a quadrature-phase intensity modulation error signal by demodulating the digital samples of the light beam using a second sinusoidal reference generated at the resonance detection modulation frequency, wherein the second sinusoidal reference is out-of-phase from the first sinusoidal reference by 90 degrees. In one embodiment, the quadrature-phase intensity modulation error signal is generated by a second loop of the demodulating feedback servo such as described with respect to FIGS. 1 and 2.

The method proceeds to 430 with producing a sinusoidal feedback control signal from the in-phase intensity modulation error signal and the quadrature-phase intensity modulation error signal. As described above, by adjusting the amplitude and phase of the sinusoidal feedback signal to drive the in-phase intensity modulation error signal and the quadrature-phase intensity modulation error signal to zero, the residual intensity modulation in the RFOG light beam can be controlled and canceled from the light beam.

Accordingly, the method proceeds to 440 with driving an intensity modulator with the sinusoidal feedback control signal, wherein the intensity modulator cancels residual intensity modulation from the light beam. In one embodiment, the sinusoidal feedback control signal is produced by generating a first control signal that is a function of the first sinusoidal reference multiplied by the in-phase intensity modulation error signal, and generating a second control signal that is a function of the second sinusoidal reference multiplied by the quadrature-phase intensity modulation error signal. Then the first control signal and the second control signal are summed to produce the sinusoidal feedback control signal. The resulting amplitude and phase of the sinusoidal feedback control signal will be a function of the amplitudes of the first control signal and the second control signal.

Several means are available to implement the systems and methods of the current invention as discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A resonant fiber optic gyroscope (RFOG) having a residual intensity modulation (RIM) controller, the controller comprising:
    an intensity modulator optically coupled to receive a light beam from a laser source modulated at a resonance detection modulation frequency;
    an optical tap device optically coupled to the intensity modulator; and
    a demodulating feedback servo coupled to the optical tap device and the intensity modulator, the demodulating feedback servo generating a sinusoidal feedback signal to the intensity modulator;
    wherein the demodulating feedback servo adjusts an amplitude and phase of the sinusoidal feedback signal provided to intensity modulator based on a residual intensity modulation detected by the demodulating feedback servo
    wherein the demodulating feedback servo comprises:
        an in-phase demodulator that demodulates using a first reference frequency at the resonance detection modulation frequency to produce a first error signal that represents an in-phase component of the intensity modulation;
        a quadrature-phase demodulator that demodulates using a second reference frequency at the resonance detection modulation frequency to produce a second error signal that represents a quadrature-phase component of the intensity modulation;
        wherein the demodulating feedback servo adjusts the amplitude and phase of the sinusoidal feedback signal based on driving both the first error signal and the second error signal to zero.

2. The controller of claim 1, wherein the intensity modulator applies a modulation to the light beam to cancel at least part of the residual intensity modulation based on the sinusoidal feedback signal.

3. The controller of claim 1, wherein the sinusoidal feedback signal has a frequency at the resonance detection modulation frequency.

4. The controller of claim 1, further comprising an analog-to-digital converter coupled to the optical tap device;
    wherein the analog-to-digital converter generates digital samples of the light beam as received at the optical tap device, wherein the digital samples are provided to the demodulating feedback servo.

5. The controller of claim 1, further comprising a summing amplifier;

wherein the demodulating feedback servo generates a first analog error signal based on multiplying the first reference frequency by the first error signal;

wherein the demodulating feedback servo generates a second analog error signal based on multiplying the second reference frequency by the second error signal; and wherein the summing amplifier sums the first analog error signal with the second analog error signal to produce the sinusoidal feedback signal.

6. The controller of claim 1, the demodulating feedback servo further comprising:

a first accumulator coupled to the in-phase demodulator, wherein the first accumulator integrates an output of the of the in-phase demodulator to produce the first error signal; and a second accumulator coupled to the quadrature-phase demodulator, wherein the second accumulator integrates an output of the quadrature-phase demodulator to produce the second error signal.

7. A residual intensity modulation (RIM) servo device for a resonant fiber optic gyroscope (RFOG), the device comprising:

a first control loop comprising an in-phase demodulator that receives digital data samples of a light beam, the first control loop generating a first error signal that is a function of an in-phase component of residual intensity modulation in the light beam;

a second control loop comprising a quadrature-phase demodulator that receives the digital data samples of the light beam, the second control loop generating a second error signal that is a function of a quadrature-phase component of residual intensity modulation in the light beam;

an amplifier coupled to the first control loop and the second control loop, the amplifier generating a sinusoidal feedback signal that drives an intensity modulator that modulates the light beam, wherein the amplitude and phase of the sinusoidal feedback signal are controlled with the first error signal and the second error signal.

8. The device of claim 7, wherein the amplitude and phase of the sinusoidal feedback signal adjust the intensity modulator to drive both the first error signal and the second error signal to zero.

9. The device of claim 7, wherein the intensity modulator applies a modulation to the light beam to cancel at least part of the residual intensity modulation based on the sinusoidal feedback signal.

10. The device of claim 7, wherein the sinusoidal feedback signal has a frequency at the resonance detection modulation frequency.

11. The device of claim 7, wherein the first control loop further comprises a first accumulator coupled to the in-phase demodulator, wherein the first accumulator integrates an output of the in-phase demodulator to produce the first error signal; and wherein the second control loop further comprises a second accumulator coupled to the quadrature-phase demodulator, wherein the second accumulator integrates an output of the quadrature-phase demodulator to produce the second error signal.

12. The device of claim 7, further comprising:

an analog-to-digital converter coupled to an optical tap device receiving the light beam;

wherein the analog-to-digital converter generates the digital samples of the light beam, wherein the digital samples are provided to the a first control loop and the second control loop.

13. The device of claim 7, further comprising:

a first signal generator that produces a first reference signal at an operating modulation frequency of the RFOG, wherein the in-phase demodulator demodulates the digital data samples using the first reference signal; and a second signal generator that produces a second reference signal at an operating modulation frequency of the RFOG, wherein the quadrature-phase demodulator demodulates the digital data samples using the second reference signal, and wherein the first reference signal and the second reference signal are out of phase by 90 degrees.

14. The device of claim 7, further comprising:

a tap device optically coupled to the intensity modulator, wherein the tap device provides a signal representing the light beam to the first control loop and the second control loop.

15. A method for controlling intensity modulation in a resonating fiber optic gyroscope (RFOG), the method comprising:

generating in-phase intensity modulation error signal by demodulating digital samples of a light beam using a first sinusoidal reference generated at a resonance detection modulation frequency;

generating quadrature-phase intensity modulation error signal by demodulating digital samples of the light beam using a second sinusoidal reference generated at the resonance detection modulation frequency, wherein the second sinusoidal reference is out-of-phase from the first sinusoidal reference by 90 degrees;

producing a sinusoidal feedback control signal from the in-phase intensity modulation error signal and the quadrature-phase intensity modulation error signal; and driving an intensity modulator with the sinusoidal feedback control signal, wherein the intensity modulator cancels residual intensity modulation from the light beam.

16. The method of claim 15, wherein producing the sinusoidal feedback control signal further comprises adjusting an amplitude and phase of the sinusoidal feedback signal to drive the in-phase intensity modulation error signal and the quadrature-phase intensity modulation error signal to zero.

17. The method of claim 15, further comprising:

generating a first control signal that is a function of the first sinusoidal reference multiplied by the in-phase intensity modulation error signal;

generating a second control signal that is a function of the second sinusoidal reference multiplied by the quadrature-phase intensity modulation error signal;

producing the sinusoidal feedback control signal by summing the first control signal and the second control signal.

18. The method of claim 15, further comprising:

generating digital samples of the light beam at a tap device that receives the light beam from the intensity modulator.

19. The method of claim 15, wherein the first error signal is proportional to an in-phase component of the residual intensity modulation; and wherein the second error signal is proportional to a quadrature-phase component of the residual intensity modulation.

* * * * *